July 27, 1954            R. E. HADADY            2,684,592
AUTOMATIC TEMPERATURE-COMPENSATED HUMIDITY INDICATOR
Filed April 11, 1949                                   2 Sheets-Sheet 1
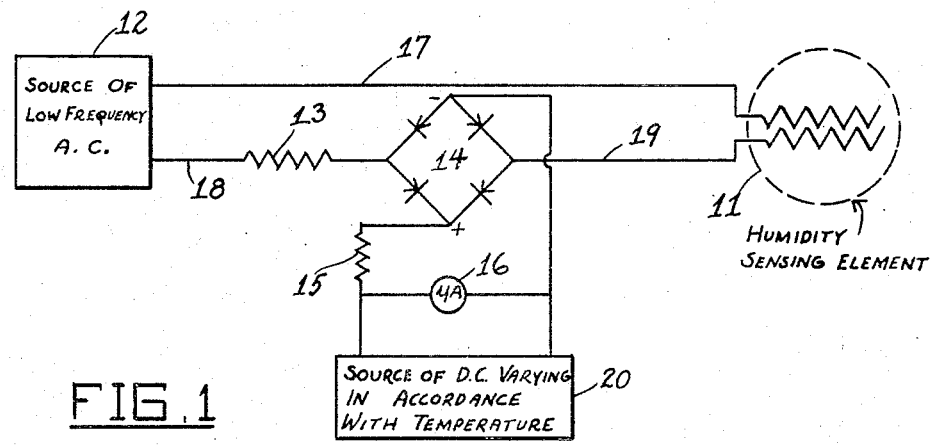
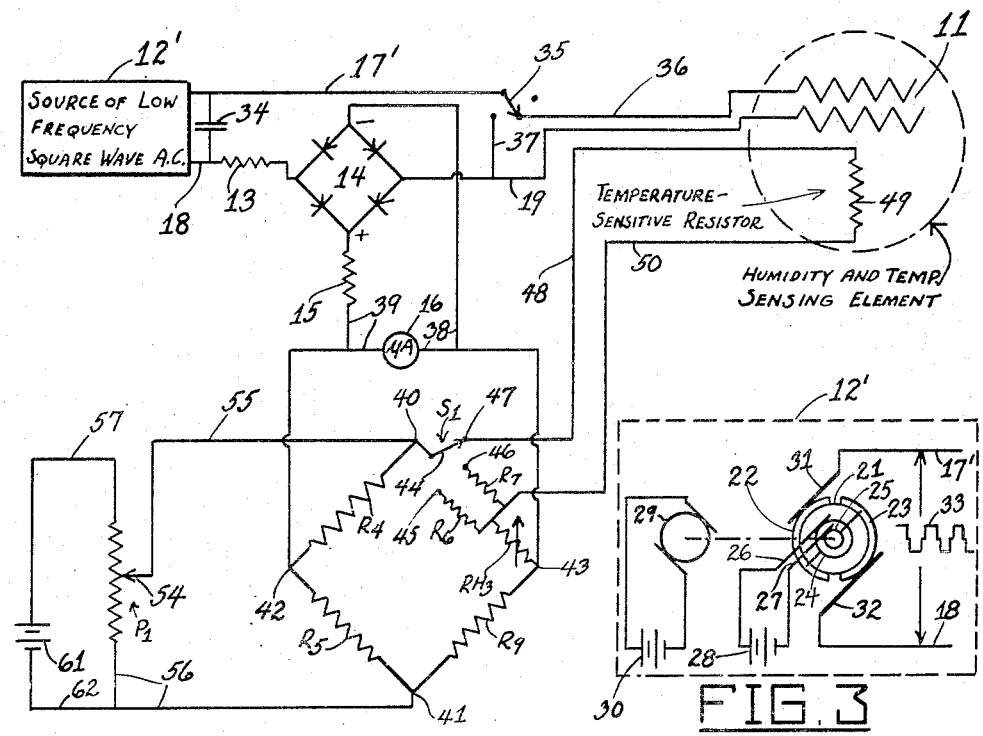
INVENTOR.
ROBERT E. HADADY
BY Herman L. Gordon
ATTORNEY July 27, 1954  R. E. HADADY  2,684,592
AUTOMATIC TEMPERATURE-COMPENSATED HUMIDITY INDICATOR
Filed April 11, 1949  2 Sheets-Sheet 2

INVENTOR.
ROBERT E. HADADY
BY Herman L. Gordon
ATTORNEY

Patented July 27, 1954

2,684,592

UNITED STATES PATENT OFFICE 2,684,592

AUTOMATIC TEMPERATURE-COMPENSATED HUMIDITY INDICATOR

Robert E. Hadady, Silver Spring, Md., assignor to The American Instrument Company, Inc., Silver Spring, Md., a corporation of Maryland Application April 11, 1949, Serial No. 86,630

10 Claims. (Cl. 73—335)

This invention relates to humidity measuring devices, and more particularly to humidity indicating systems wherein an electric circuit is employed containing a humidity-sensing element of the current-modifying type.

A main object of the invention is to provide a novel and improved humidity indicating device which is simple in structure, easy to use, and which is automatically corrected for temperature, whereby direct readings of relative humidity may be obtained without requiring the observer to refer to temperature correction tables or charts.

A further object of the invention is to provide an improved electrical humidity indicator which is very stable in performance, which provides accurate automatic temperature-corrected humidity readings, and which permits relatively long lines to be employed between the humidity-sensing element thereof and the remainder of the apparatus.

A still further object of the invention is to provide an improved portable electrical humidity indicator of the type employing as its humidity-sensing element a bifilar unit whose resistance varies with humidity, the indicator providing means for periodically reversing the polarity of the potential applied across the unit without requiring the use of an alternating current source.

A still further object of the invention is to provide an improved electrical humidity indicator of the type employing a bifilar-wound sensing element, the indicator providing means for periodically reversing the potential applied across the element and at the same time furnishing periodic electrical interruptions which prevent static friction effects from interfering with the normal action of the bearings of the meter employed with the indicator.

A still further object of the invention is to provide an improved portable electrical humidity indicator of the type employing a bifilar-wound sensing element, the indicator providing means for periodically reversing the potential applied across the element at a low frequency without requiring the use of an alternating current source, wherein relatively long lines may be employed between the element and the remainder of the apparatus, and wherein a direct current meter may be employed in the indicating circuit without requiring the use of a rectifier, thereby eliminating sources of error heretofore caused by changes of internal rectifier resistance with temperature and changes in rectifier characteristics produced by aging.

Further objects and advantages of the invention will become apparent from the following description and claims, and from the accompanying drawings, wherein:

Figure 1 is a schematic diagram illustrating one form of humidity indicating apparatus constructed in accordance with the present invention.

Figure 2 is an expanded schematic diagram further illustrating the form of the invention shown in Figure 1.

Figure 3 is a schematic diagram illustrating a D. C.-derived source of low frequency alternating current which may be employed in the humidity indicator illustrated in Figure 1 or Figure 2.

Figure 4:
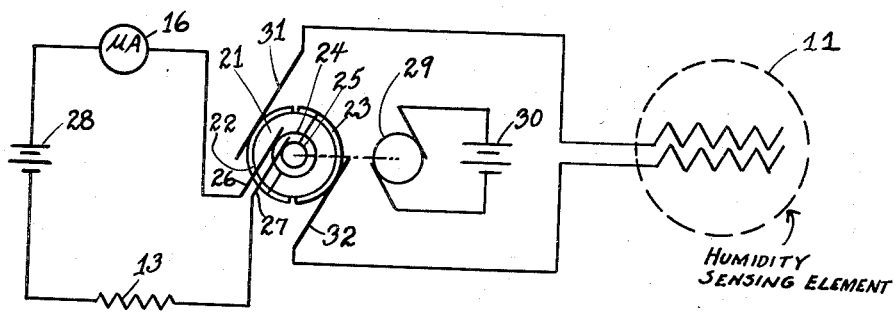
Figure 4 is a schematic diagram illustrating another form of the present invention.

Referring to the drawings, and more particularly to Figure 1, 11 designates a humidity-sensing element of the bifilar-wound type, such as is disclosed in the United States patent to Francis W. Dunmore, issued June 9, 1942, No. 2,285,421. Said element comprises a pair of spaced bifilar windings mounted on a suitable form upon which is deposited a thin film of hygroscopic material such as lithium chloride, or the like, which has the property of changing its conductivity in accordance with the amount of moisture absorbed thereby from the atmosphere adjacent thereto, and hence provides a variable resistance across the terminals of the element, which varies in accordance with humidity. Since the response of the element 11 is merely a function of total moisture content in the atmosphere, in order to obtain relative humidity it is necessary to take into account the temperature of the atmosphere whose humidity is being measured. Heretofore, the correction for temperature has been made by reference to a temperature correction chart giving the percentage corrections for deviations from a given temperature, such as 80° F., or other values, depending upon the range of temperatures for which the element is calibrated. This involves a separate observation of temperature, which increases the amount of time required to make a humidity measurement and creates numerous opportunities for error.

Referring again to Figure 1, it will be seen that the indicating circuit comprises a source of low frequency alternating current 12, such as shown in Figure 3, a current-limiting resistor 13, a full-wave instrument rectifier 14, another current-limiting resistor 15, a microammeter 16, and the humidity-sensing element 11. One output terminal of the source 12 is connected by a wire 17 to one terminal of the element 11. The other terminal of source 12 is connected by a wire 18 through resistor 13 to one input terminal of rectifier 14. The other input terminal of rectifier 14 is connected by a wire 19 to the remaining terminal of element 11. The microammeter 16 is connected across the output terminals of rectifier 14 in series with the current-limiting resistor 15. It is necessary to employ an alternating potential impressed across the element 11 to avoid polarization effects. The frequency of this alternating potential must be relatively low in order to avoid capacity effects between wires 17 and 19, which would produce errors in the response of the circuit when said wires are of substantial length, as where the humidity-sensing element 11 is located at a position remote from the remainder of the apparatus.

In accordance with the present invention, a source of direct current, shown generally at 20 in Figure 1, which varies in accordance with temperature, is connected across the microammeter 16. Referring to Figure 2, a humidity indicator circuit similar to Figure 1 is disclosed wherein the temperature-responsive compensating circuit is shown in detail. Designated at 12' is a direct current-derived source of low frequency square wave alternating current which may comprise an arrangement such as is illustrated in Figure 3. In Figure 3, 21 designates a rotor having a split commutator comprising the opposing segments 22 and 23. The rotor has respective slip rings 24 and 25 connected respectively to commutator segments 22 and 23. Engaging the slip rings 24 and 25 are the respective brushes 26 and 27. Brush 26 is connected to the positive pole of a battery 28 and brush 27 is connected to the negative pole of said battery. Rotor 21 is driven at a constant low speed by a motor 29 energized from a battery 30. Engaging the commutator segments 22 and 23 are the respective brushes 31 and 32. Connected to said brushes are the respective output wires 17' and 18, across which appears a square wave alternating potential shown diagrammatically at 33.

As shown in Figure 2, a condenser 34 is connected across output wires 17' and 18 to prevent excessive sparking at the brushes 31 and 32. Wire 18 is connected through resistor 13 to one input terminal of rectifier 14. Wire 17' is connected to the pole of a single-pole triple-throw switch 35. One stationary contact of switch 35 is connected by a wire 36 to one terminal of element 11. Another stationary contact of said switch is connected by a wire 37 to the wire 19, connecting the other input terminal of rectifier 14 to the remaining terminal of element 11. One output terminal of rectifier 14 is connected by a wire 38 to one terminal of microammeter 16. The other output terminal of the rectifier is connected through resistor 15 to the remaining terminal of the microammeter by a wire 39.

The temperature compensating network comprises a bridge circuit having the input terminals 40 and 41 and the output terminals 42 and 43. Connected between terminals 40 and 42 is a fixed resistor R4 and connected between terminals 42 and 41 is another fixed resistor R5 which is preferably equal in value with R4. Connected between terminals 40 and 43 is a variable circuit, shown in Figure 2. Connected to terminal 40 is the pole 44 of a three-contact switch S1. Said switch has fixed contacts shown respectively at 45, 46 and 47. Connected to contact 47 by a wire 48 is one terminal of a temperature-sensitive resistor 49 of the thermistor type which is mounted in the housing of the humidity-sensitive element 11, closely adjacent thereto. The other terminal of resistor 49 is connected to a wire 50. Connected between contact 45 and wire 50 is a fixed resistor R6, and connected between contact 46 and wire 50 is another fixed resistor R7. Connected between wire 50 and terminal 43 is a variable resistor RH3.

Connected between terminals 43 and 41 is a fixed resistor R9, preferably equal in value to R5 and R4.

Designated at P1 is a potentiometer whose movable contact, shown at 54, is connected by a wire 55 to terminal 40. One of the remaining terminals of the potentiometer is connected by a wire 56 to the bridge terminal 41. The other remaining terminal of the potentiometer is connected by a wire 57 to the positive pole of a battery 61, whose negative pole is connected by a wire 62 to wire 56.

The following table lists the values of the various fixed resistors employed in a typical circuit such as described above:

| Fixed resistor: | Value in ohms |
|---|---|
| 13 | 900,000 |
| R6 | 17,300 |
| 15 | 10,000 |
| R7 | 41,250 |
| R4 | 18,000 |
| R9 | 18,000 |
| R5 | 18,000 |

The instrument is adjusted for use in the following manner:

1. With switch pole 35 in open-circuit position, switch pole 44 is engaged with contact 45, thereby connecting R6 in series with RH3 between terminals 40 and 43. (R6 represents the resistance of thermistor 49 at a given temperature, say 0° F.) The bridge is then balanced by adjusting RH3 to give a zero reading on microammeter 16.

2. Switch pole 44 is then engaged with contact 46, thereby connecting R7 in series with RH3 between terminals 40 and 43. (R7 represents the thermistor resistance at full scale, say 100° F.) The voltage on the bridge is then adjusted by means of the potentiometer P1 until the bridge voltage provides a full scale meter reading.

3. Pole 44 is then engaged with contact 47, connecting thermistor 49 in series with RH3 between terminals 40 and 43. The reading of the meter will then be in accordance with the thermistor resistance.

4. Switch pole 35 is then connected to wire 36. The reading of the meter will then be in accordance with relative humidity, since the thermistor circuit will compensate the meter readings for temperature.

The values of resistors R9, R4, R5 and RH3 are selected so as to provide, as closely as possible, a linear scale on microammeter 16.

Figure 4 illustrates a form of the invention wherein a direct current meter may be employed with the humidity sensing element 11 without requiring the use of an instrument rectifier. In Figure 4, the meter 16 is connected to battery 28 in series with the brushes 26, 27 and the resistor 13. The brushes 26 and 27 engage the slip rings 24 and 25 of a rotor 21, similar to that shown in Figure 3. The output brushes 31 and 32, engaging the commutator segments 22 and 23 of said rotor, are connected to the respective terminals of the humidity-sensing element 11. The rotor is driven by a motor 29 energized from a battery 30. It will be seen from Figure 4 that the potential applied to element 11 reverses every half revolution of rotor 21, thereby preventing polarization effects from building up across the bifilar windings of the element. The current flowing through microammeter 16, however, does not change in polarity, but each time the commutator segments 22, 23 shift from contact with one brush to the other of the output brushes 31, 32, a momentary open-circuit occurs. The current flowing through microammeter 16 is therefore intermittently interrupted at a constant frequency. This periodic interruption serves to eliminate the effects of static friction in the meter bearings and insures accurate meter readings at all times.

Comparing Figure 4 with Figure 1, it will be seen that the circuit of Figure 4 requires no instrument rectifier, thereby eliminating possible sources of error due to changes in rectifier characteristics from aging effects, and requiring no special calibration of the meter in accordance with the characteristics of the instrument rectifier used therewith.

Figure 5:
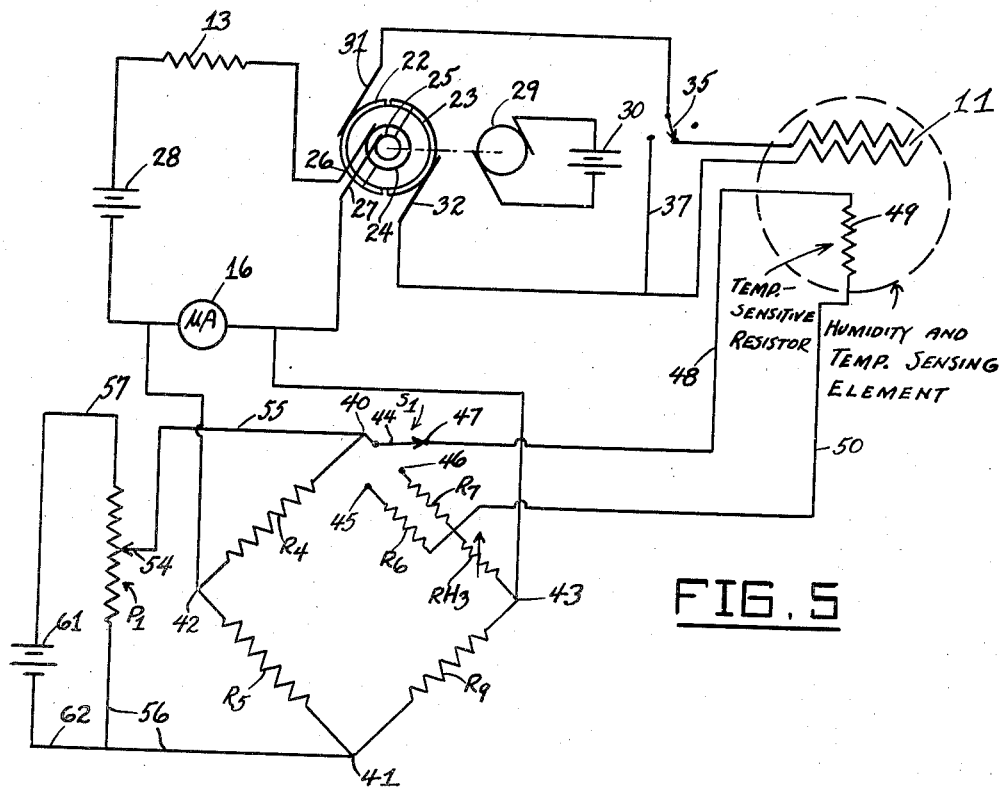
Figure 5 is an expanded schematic diagram showing still another form of the present invention.

Figure 5 illustrates the use of a temperature compensating circuit, such as the temperature compensating circuit of Figure 2, with the improved humidity sensing circuit of Figure 4. As in Figure 2, the temperature compensating circuit is connected across the terminals of the microammeter 16, and the temperature-sensitive resistor 49 is mounted in the same housing as the humidity sensing element 11. The adjustment and operation of the circuit of Figure 5 is similar to that of Figure 2.

While certain specific embodiments of humidity measuring devices have been disclosed in the foregoing description, it will be understood that various modificatons within the spirit of the invention may occur to those skilled in the art. Therefore it is intended that no limitations be placed on the invention except as defined by the scope of the appended claims.

What is claimed is:

1. A humidity measuring device of the character described, comprising a series circuit including a direct current source, a meter, a humidity-sensing element of the current-modifying type, and means for periodically reversing the connections of said element in the circuit.

2. A humidity measuring device of the character described, comprising a series circuit including a direct current source, a meter, a humidity-sensing element of the bifilar-wound type, and means for periodically opening the circuit and reversing the connections of said element therein.

3. A humidity measuring apparatus of the character described, comprising a series circuit including a direct current source, a meter, and a humidity-sensitive current-modifying device, said device comprising a motor-driven rotor having a pair of input slip rings, brush means engaging said slip rings and connected to said circuit, a pair of commutator segments connected respectively to said slip rings, brushes respectively engaging said commutator segments, and a bifilar-wound humidity sensing element whose terminals are respectively connected to said latter brushes.

4. A humidity measuring apparatus of the character described, comprising a series circuit including a direct current source, a meter, a humidity-sensing element of the current-modifying type, and means for periodically reversing the potential applied across the element, and a source of potential varying in accordance with temperature connected to the meter.

5. A humidity measuring apparatus of the character described, comprising a series circuit including a direct current source, a meter, a humidity-sensing element of the bifilar-wound type, and means for periodically opening the circuit and reversing the connections of said element therein, and a source of potential varying in accordance with temperature connected to the meter.

6. A humidity measuring apparatus of the character described, comprising a series circuit including a direct current source, a meter, and a humidity-sensitive current-modifying device, said device comprising a motor-driven rotor having a pair of input slip rings, brush means engaging said slip rings and connected to said circuit, a pair of commutator segments connected respectively to said slip rings, brushes respectively engaging said commutator segments, and a bifilar-wound humidity-sensing element whose terminals are respectively connected to said latter brushes, and a source of potential varying in accordance with temperature connected to the meter.

7. A humidity measuring apparatus of the character described, comprising a series circuit including a direct current source, a meter, a humidity-sensing element of the current-modifying type, and means for periodically reversing the potential applied across the element, and a source of potential varying in accordance with temperature connected across the meter, said latter source comprising an impedance bridge having a source of constant potential connected to its input terminals, one of the arms of said bridge including a temperature-sensitive resistor.

8. A humidity measuring apparatus of the character described, comprising a series circuit including a direct current source, a meter, a humidity sensing element of the bifilar-wound type, and means for periodically opening the circuit and reversing the connections of said element therein, and a source of potential varying in accordance with temperature connected across the meter, said latter source comprising a bridge circuit having a source of constant potential connected to its input terminals, said bridge circuit including a temperature-sensitive resistor.

9. A humidity measuring apparatus of the character described comprising a series circuit including a direct current source and a meter, a humidity sensing element of the bifilar current-modifying type subject to polarization, and circuit means connecting said element to said circuit and including means arranged to periodically reverse the potential across said element.

10. In combination, a direct current source, an electrical indicator, a humidity-sensitive element of the bifilar type subject to polarization, means connecting the source, the indicator and the element in circuit, reversing switch means in the circuit, and means whereby said reversing switch means periodically reverses the polarity of the potential appearing across the element.

References Cited in the file of this patent

UNITED STATES PATENTS

| Number | Name | Date |
| --- | --- | --- |
| 1,379,266 | Keeler | May 24, 1921 |
| 1,855,774 | Schneider | Apr. 26, 1932 |
| 1,932,033 | Dawson | Oct. 24, 1933 |
| 1,956,386 | Gruss | Apr. 24, 1934 |
| 2,285,421 | Dunmore | June 9, 1942 |

FOREIGN PATENTS

| Number | Country | Date |
| --- | --- | --- |
| 466,391 | Great Britain | May 27, 1937 |